US009210094B1

(12) United States Patent (10) Patent No.: US 9,210,094 B1
Warren et al. (45) Date of Patent: Dec. 8, 2015

(54) UTILIZATION OF TCP SEGMENTATION OFFLOAD WITH JUMBO AND NON-JUMBO NETWORKS

(71) Applicant: F5 NETWORKS, INC., Seattle, WA (US)

(72) Inventors: Jeffrey Michael Warren, Seattle, WA (US); Peter Michael Thornewell, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 178 days.

(21) Appl. No.: 13/730,535

(22) Filed: Dec. 28, 2012

Related U.S. Application Data

(60) Provisional application No. 61/664,470, filed on Jun. 26, 2012.

(51) Int. Cl.
*H04L 12/805* (2013.01)
*H04L 12/24* (2006.01)

(52) U.S. Cl.
CPC .............. *H04L 47/36* (2013.01); *H04L 41/028* (2013.01)

(58) Field of Classification Search
CPC .................................................. H04L 41/028
USPC .......................................................... 370/235
See application file for complete search history.

(56) References Cited

U.S. PATENT DOCUMENTS 7,826,487 B1 * 11/2010 Mukerji et al. ............... 370/477
2002/0141448 A1 * 10/2002 Matsunaga .................... 370/469

OTHER PUBLICATIONS

"Diameter (protocol)," Wikipedia, the free encyclopedia, created Oct. 26, 2004, 15 pages.
"Jumbo frame," Wikipedia, the free encyclopedia, created Feb. 4, 2006, 3 pages.
"Large receive offload," Wikipedia, the free encyclopedia, created Aug. 22, 2007, 2 pages.
"Large segment offload," Wikipedia, the free encyclopedia, created Jan. 18, 2006, 2 pages.
"Maximum segment size," Wikipedia, the free encyclopedia, created Aug. 16, 2004, 2 pages.
"Maximum transmission unit," Wikipedia, the free encyclopedia, created Jan. 2, 2002, 5 pages.
"TCP offload engine," Wikipedia, the free encyclopedia, created Jul. 22, 2004, 6 pages.
"The TCP/IP Guide—TCP Maximum Segement Size (MSS) and Relationship to IP Datagram Size," The TCP/IP Guide, Version 3.0, Sep. 20, 2005, 3 pages.
"Transmission Control Protocol," RFC 793, DARPA Internet Program, Protocol Specification, Sep. 1981, 91 pages.
"Transmission Control Protocol," Wikipedia, the free encyclopedia, created Sep. 28, 2001, 16 pages.

(Continued)

*Primary Examiner* — Dang Ton
*Assistant Examiner* — Mewale Ambaye
(74) *Attorney, Agent, or Firm* — John W. Branch; Lowe Graham Jones PLLC (57) ABSTRACT

A traffic management device (TMD) is situated between a one or more network devices providing jumbo network traffic and one or more device providing non-jumbo network traffic. The TMD is configured to employ TCP segmentation offload hardware within a Network Interface Card (NIC) at the level two/four layers of the OSI stack by rewriting maximum segment size (MSS) information during initial handshake operations, such that jumbo frames may be split into digestible size frames for a non-jumbo network communications.

22 Claims, 4 Drawing Sheets

(56) References Cited

OTHER PUBLICATIONS

"What is TCP segmentation offload?," Webopedia.com, accessed Jun. 20, 2012, 2 pages http://www.webopedia.com/TERM/T/TCP_segmentation_offload.html.

Dykstra, P. "Gigabit Ethernet Jumbo Frames; and why you should care," WareOnEarth Communications, Inc., Dec. 20, 1999, 5 pages http:/ds.wareonearth.com/~phil/jumbo.html.

Liu, J. et al., "Introduction to Diameter," developerWorks, IBM, Jan. 24, 2006, 9 pages http://www.ibm.com/developerworks/library/wi-diameter/index.html.

MacVittie, L., "Message-Based Load Balancing," F5, 2009, 9 pages.

F5 Networks, "Big-IP Local Traffic Manager Concepts Version 11.2.1" https://support.f5.com/kb/en-us/products/big-ip_ltm/manuals/product/itm-implementations-11-2-1.html, publication date Aug. 31, 2012, accessed on Jul. 23, 2015 (272 pages).

F5 Networks, "Big-IP Local Traffic Manager: Implementations Version 11.2.1" https://supportf5.com/kb/en-us/products/big-ip_ltm/manuals/product/ltm-implementations-11-2-1.html, publication date Aug. 31, 2012, accessed on Jul. 23, 2015 (272 pages).

* cited by examiner

UTILIZATION OF TCP SEGMENTATION OFFLOAD WITH JUMBO AND NON-JUMBO NETWORKS

CROSS-REFERENCE TO RELATED APPLICATION

This application is a utility patent application based on previously filed U.S. Provisional Patent Application, Ser. No. 61/664,470 filed on Jun. 26, 2012, the benefit of which is hereby claimed under 35 U.S.C. §119(e) and which is incorporated herein by reference.

TECHNICAL FIELD

The present invention relates generally to network communications, and more particularly, but not exclusively, to managing traffic flow between jumbo and non-jumbo network communications.

TECHNICAL BACKGROUND

When data is transmitted over various networks, it is often transmitted using the Transmission Control Protocol (TCP), which is one of the core protocols of the Internet Protocol (IP) suite. Using TCP, when an application sends data across the network, the TCP often breaks the data into pieces that may be more readily managed and transmitted over the network. However, due to network congestion, traffic load balancing, or other unpredictable network behavior, some of these pieces, sometimes known as IP packets, can be lost. Loss of packets may require that a sending device must duplicate and or resend the data. Moreover, smaller packet sizes may mean that a computer may have more central processing unit (CPU) interrupts and more processing overhead. Thus, there is often a desire to reduce the number of packets transmitted, thereby reducing a likelihood of lost packets. Larger sized packets may result in transmitting a larger amount of data with less effort, reducing CPU utilization (in part due to interrupt reductions) and increasing throughput by reducing a number of packets needing to be transmitted and/or processed.

However, many devices on today's networks, such as routers, gateways, physical cables, or the like, even sending/receiving computing devices including operating systems, may be constrained in how large a packet they can handle. Moreover, when a large packet is lost, it may mean that a large amount of data must be retransmitted. Moreover, adding large packets onto a network may sometimes result in transmission delays of smaller packets over the same network. Thus, there remain benefits as well as disadvantages to using larger packets.

One challenge that often arises is when one networking infrastructure employs smaller packet sizes, and another networking infrastructure employs or is designed to be able to use larger packet sizes. In this situation, the larger packet size networking infrastructure often is constrained, when trying to communicate with the smaller packet size networking infrastructure to using smaller packet sizes. This may result in inefficiencies within the larger packet size networking infrastructure. Therefore, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "network connection" refers to a collection of links and/or software elements that enable a computing device to communicate with another computing device over a network. One such network connection may be a Transmission Control Protocol (TCP) connection. TCP connections are virtual connections between two network nodes, and are typically established through a TCP handshake protocol. The TCP protocol is described in more detail in Request for Comments (RFC) 793, available from the Internet Engineering Task Force (IETF), and is hereby incorporated by reference in its entirety. A network connection "over" a particular path or link refers to a network connection that employs the specified path or link to establish and/or maintain a communication. The term "node" refers to a network element that typically interconnects one or more devices, or even networks.

While the above discussions referred to larger and smaller packet sized networks, several other terms are defined herein to provide more clarity. First, TCP typically is configured to accept data and segment it into chunks, and add a TCP header to the chunks, creating what is termed a "TCP segment." TCP segments may then be encapsulated into what is termed, an "IP datagram." These TCP segments are sometimes referred to as 'the packet' of information that TCP uses to exchange data with other devices over the network. However, where a segment refers to the TCP Protocol Data Unit, other terms such as "datagram" refers to the IP PDU, and the term "frame" to the data link layer's PDU.

As used herein, a typical Ethernet frame is around 1500 bytes in size. However, the term "jumbo frames" refers to frames with more than 1500 bytes in its payload. It should be understood therefore, that the term "non-jumbo frames" refers to networking infrastructures transmitting frames typically 1500 bytes or less.

Further, as noted above, network connections typically are established through a TCP handshake protocol. This TCP handshake is typically a three-way handshake, where a client device, sends a synchronization (SYN) message to a server device to initiate an active open of a port for a connection with the server device. The server replies with an acknowledgement message and its own SYN(SYN-ACK). Finally, the client device sends back an ACK to the server device. At this juncture, both the client device and the server device have received acknowledgements of the connection.

During this TCP handshake, a first (peer) device can inform the other (peer) (or second) device of the maximum segment size (MSS) that the device is willing to accept. A device that chooses to provide such information typically does so by including the MSS information within its SYN message. The other device receives this information and records the MSS for the connection. Subsequent communications with the first peer device then are intended to provide frames having a MSS that does not extend this segment size.

The TCP and IP refer to various protocols used with what is known as the Open Systems Interconnection ("OSI") conceptual network model. The OSI model is commonly used to define the flow of data, or "network traffic," over a network between network applications and/or devices. The OSI model has seven layers including the application layer ("Layer-7"), the presentation layer ("Layer-6"), the session layer ("Layer-5"), the transport layer ("Layer-4"), the network layer ("Layer-3"), the data link layer ("Layer-2"), and the physical layer ("Layer-1"). Each OSI layer communicates with a layer above and/or below it and with corresponding layer(s) on other applications and/or devices in the network through specific protocols. The network layers are often referred to as "the network stack." As discussed above, these layers are often implemented using the TCP/IP protocols. The TCP portion of the protocol corresponds to the Layer-4 transport layer in the OSI model. The IP portion of the protocol defines standards for data packets that may comprise data message(s) at the Layer-3 application layer.

In one embodiment, managing the above discussed segmentation may be performed using what is herein called, TCP segmentation offload or "TSO" to reduce the CPU overhead of TCP/IP. TSO may be performed in what is referred to as a network interface controller (NIC) card that may segment the data, and add the TCP, IP and data link layer protocol headers to each segment. In one embodiment, the NIC card may include a TCP offload engine (or TOE) that performs such processing and thereby offloads the processing from a computer's main CPU. In one embodiment the TOE may also be configured to perform a TCP Large Receive Offload or LRO operation on received frames.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed toward managing communications between jumbo and non-jumbo network traffic. In one embodiment, a traffic management device (TMD) is situated/interposed between the jumbo and non-jumbo networks, and is configured to intercept messages exchanged between a 'jumbo' device and a 'non-jumbo' device, and to rewrite the MSS information between the two devices. In one embodiment, the TMD is configured to employ TCP segmentation offload hardware within the NIC card at the level two/four layers of the OSI stack. Further, the TMD may be configured to re-write the maximum segment size (MSS) information during initial handshake operations. This may be performed for packets directed from the jumbo device to the non-jumbo device. Optionally, the NIC may employ LRO operations to provide jumbo frames from multiple non-jumbo frames.

As disclosed herein the subject innovation enables splicing of jumbo and non-jumbo frames at layers 4 and/or 2. Typically an L2 or L4 intermediate device does not modify the MSS information defined in the initial handshake and devices will have to transition frames with the lowest combination of advertised MSS, which may then result in 1460 byte frames being transmitted on both sides. By manipulating the MSS during the initial handshake and negotiating a larger MSS with the jumbo frame side of the TMD, both devices may be satisfied. For example, on a non-jumbo Ethernet network, the non-jumbo device would send a SYN with an MSS of 1460, then when forwarding on to the jumbo frame network, the MSS would be increased to say 8760 (6 times 1460). The SYN-ACK from the jumbo device would have an MSS of 8960, which could optionally be reduced to 1460. One advantage of this innovative approach is that one packet/poll and send cycle is then employed to send 6 times the 'normal' amount of data from jumbo to non-jumbo with no additional CPU requirement by the TMD.

Illustrative Operating Environment

Figure 1:
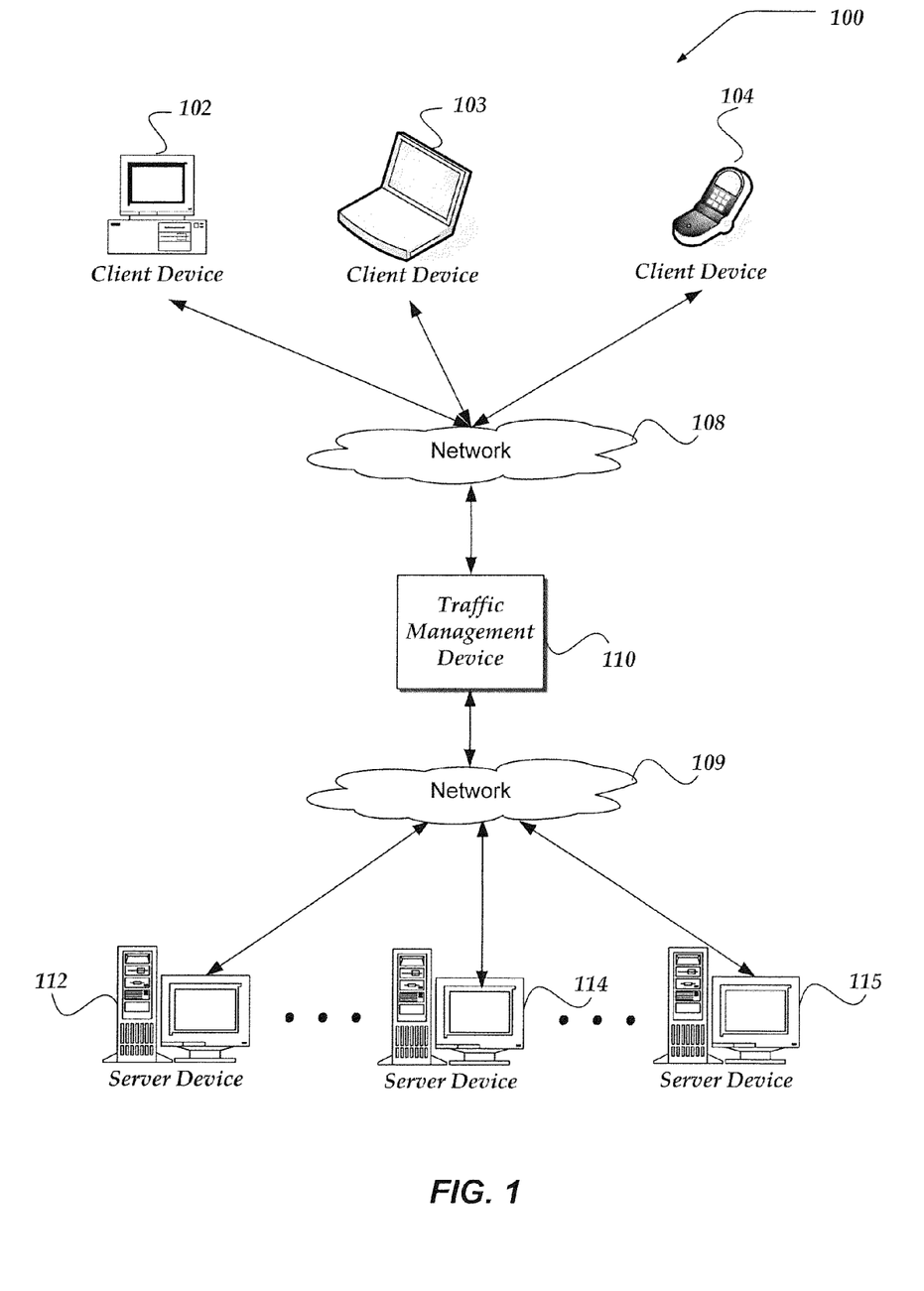
FIG. 1 shows components of an illustrative environment in which the described embodiments may be practiced.

FIG. 1 shows components of an illustrative environment 100 in which the described embodiments may be practiced. Not all the components may be required to practice the described embodiments, and variations in the arrangement and type of the components may be made without departing from the spirit or scope of the described embodiments. FIG. 1 illustrates client devices 102-104, networks 108-109, and Traffic Management Device (TMD) 110.

Generally, client devices 102-104 may include virtually any computing device capable of connecting to another computing device and receiving information. Such devices may include personal computers, multiprocessor systems, microprocessor-based or programmable consumer electronics, network devices, server devices, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include virtual computing devices running in a hypervisor or some other virtualization environment. As such, client devices 102-104 may range widely in terms of capabilities and features.

Networks 108-109 are configured to couple network enabled devices, such as client devices 102-104, TMD 110, and server devices 112-115, with other network enabled devices. Networks 108-109 are enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Networks 108-109 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, networks 108-109 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, networks 108-109 include any communication method by which information may travel between one network device and another network device.

However, in one embodiment, network 108 and/or client devices 102-104 may be configured to communicate using non-jumbo frames, while network 109 and/or server devices 112-115 are configured to employ jumbo frames. Thus, network 108 may be referred to as a non-jumbo network, while network 109 is referred to as a jumbo network. However, it should be understood, that while network 109 is configured as a jumbo network, network 109 may also be capable of communicating non-jumbo frames.

One embodiment of a Traffic Management Device 110 is described in more detail below in conjunction with FIG. 2. Briefly, however, TMD 110 includes virtually any network device that manages network traffic. Such devices include, for example, routers, proxies, firewalls, load balancers, cache devices, application accelerators, devices that perform network address translation, any combination of the preceding devices, or the like. TMD 110 may control, for example, the flow of data packets delivered to or forwarded from an array of server devices, such as server devices 112-115. In one embodiment, messages sent between the TMD 110 and the server devices 112-115 may be sent using jumbo frames.

TMD 110 may direct a request for a resource to a particular server device based on network traffic, network topology, capacity of a server device, content requested, and a host of other traffic distribution mechanisms. TMD 110 may receive data packets from and transmit data packets to the Internet, an intranet, or a local area network accessible through another network. TMD 110 may recognize packets that are part of the same communication, flow, and/or stream and may perform special processing on such packets, such as directing them to the same server device so that state information is maintained. TMD 110 also may support a wide variety of network applications such as Web browsing, email, telephony, streaming multimedia and other traffic that is sent in packets. The BIG-IP® family of traffic managers, by F5 Networks of Seattle, Wash., are examples of TMDs.

In one embodiment, TMD 110 may intercept TCP handshake protocol messages sent between a client device, such as client devices 102-104, from a non-jumbo network infrastructure, and a server device, such as server devices 112-115. In one embodiment, TMD 110 may rewrite MSS information from the non-jumbo client device, to indicate that messages from the server, jumbo network infrastructure are to use jumbo frames. TMD 110 may perform such actions as discussed further below in conjunction with FIG. 3.

Server devices 112-115 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 112-115 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between server devices 112-115, TMD 105, and client device 102 employing HTTP, HTTPS, or any of a variety of protocols.

In one embodiment, server devices 112-115 are configured to operate as a website server. However, server devices 112-115 are not limited to web server devices, and may also operate a messaging server, a File Transfer Protocol (FTP) server, a database server, content server, and the like. Additionally, each of server devices 112-115 may be configured to perform a different operation. Thus, for example, server device 112 may be configured as a messaging server, while server device 113 is configured as a database server. Moreover, while server devices 112-115 may operate as other than a website, they may still be enabled to receive an HTTP communication, as well as a variety of other communication protocols.

As noted, server devices 112-115 may be configured to provide communications, including messages over network 109 and/or network 108 using jumbo frames. However, in one embodiment, server devices 112-115 may also provide non-jumbo frames.

Devices that may operate as server devices 112-115 include personal computers, desktop computers, multiprocessor systems, microprocessor-based or programmable consumer electronics, network PCs, server devices, and the like.

Illustrative Network Device

Figure 2:
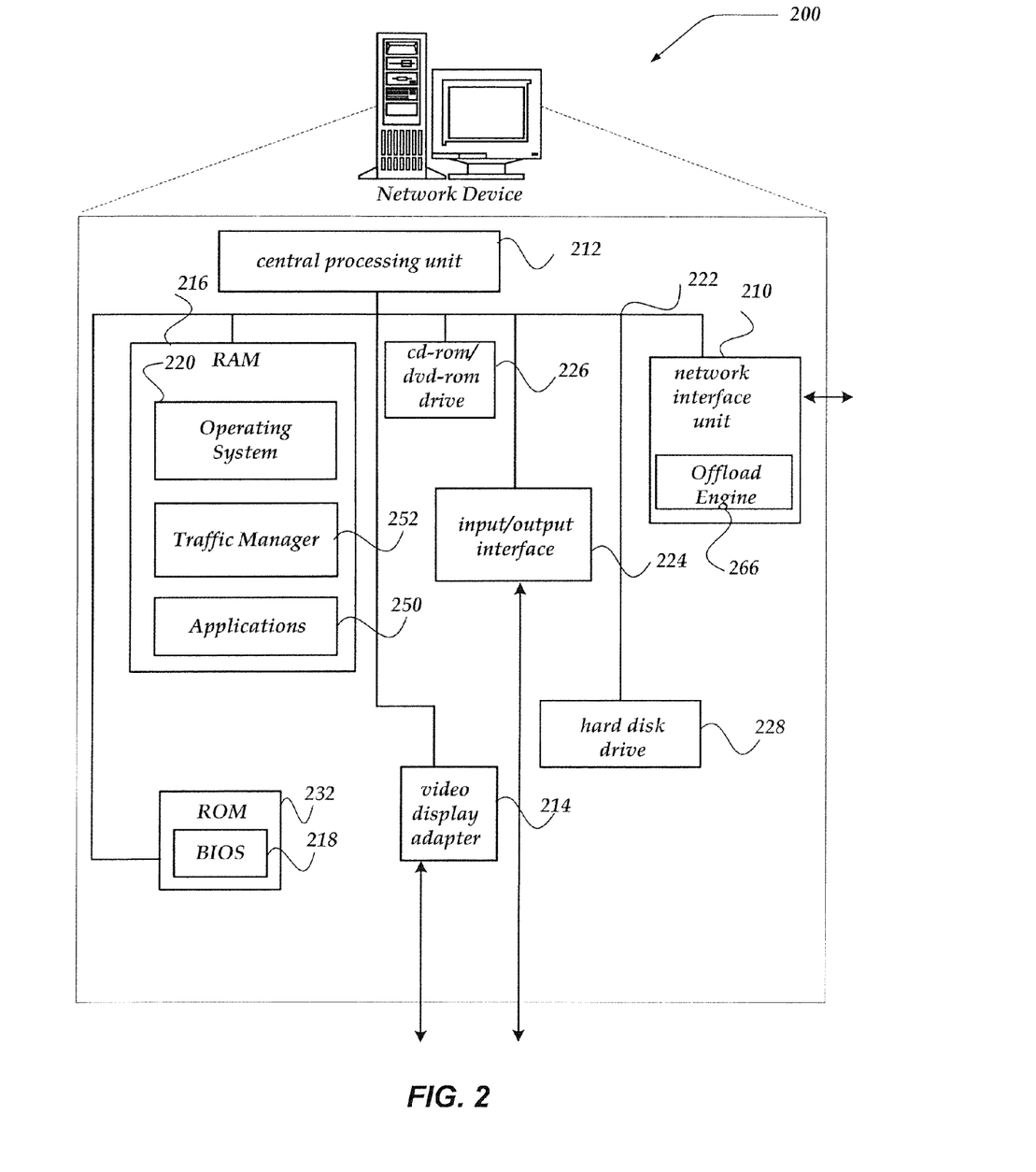
FIG. 2 shows one embodiment of a network device usable to perform rewrites of maximum segment size data within synchronization (SYN) handshake messages to enable communications between one device communicating with jumbo frames and another device using non-jumbo frames.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 110 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Network device 200 also includes applications 250, and traffic manager 252.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface controller (NIC) card. As shown, network interface unit 210 may include offload engine 266. In one embodiment, offload engine 266 may represent hardware integrated circuitry that is configured to perform TCP offload operations. However, offload engine 266 may also represent computer-executable instructions installed within a processor operating with NIC card 210. The mass memory as described above illustrates another type of computer readable media, namely computer storage devices. Computer storage devices may include volatile, nonvolatile, removable, and non-removable devices implemented in any method or technology for non-transitory storage of information, such as computer readable instructions, data structures, program modules, or other data. Examples of computer storage devices include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical non-transitory medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, traffic management programs, security programs, and so forth.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like.

Network device 200 may also include traffic manager 252 that is configured to control the flow of data packets delivered to and forwarded from various devices. Traffic manager 252 may direct a request for a resource to a particular device based on network traffic, network topology, capacity of a device, content requested, and a host of other traffic distribution mechanisms. Traffic manager 252 may receive data packets from and transmit data packets to the Internet, an intranet, or a local area network accessible through another network. Traffic manager 252 may recognize packets that are part of the same communication, flow, and/or stream and may perform special processing on such packets, such as directing them to the same server so that state information is maintained.

In one embodiment, TMD 252 may be configured to receive messages intercepted during an initial TCP handshake protocol between peers, and rewrite MSS information within the messages to enable communications between jumbo and non-jumbo devices/infrastructures, such that jumbo frames may be employed by the jumbo device. Further, in one embodiment, at least some packet processing is performed within offload engine 266, including, for example, performing packet segmentations, packet combining, and header management.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operations of offload engine 266.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Generalized Operation

Figure 3:
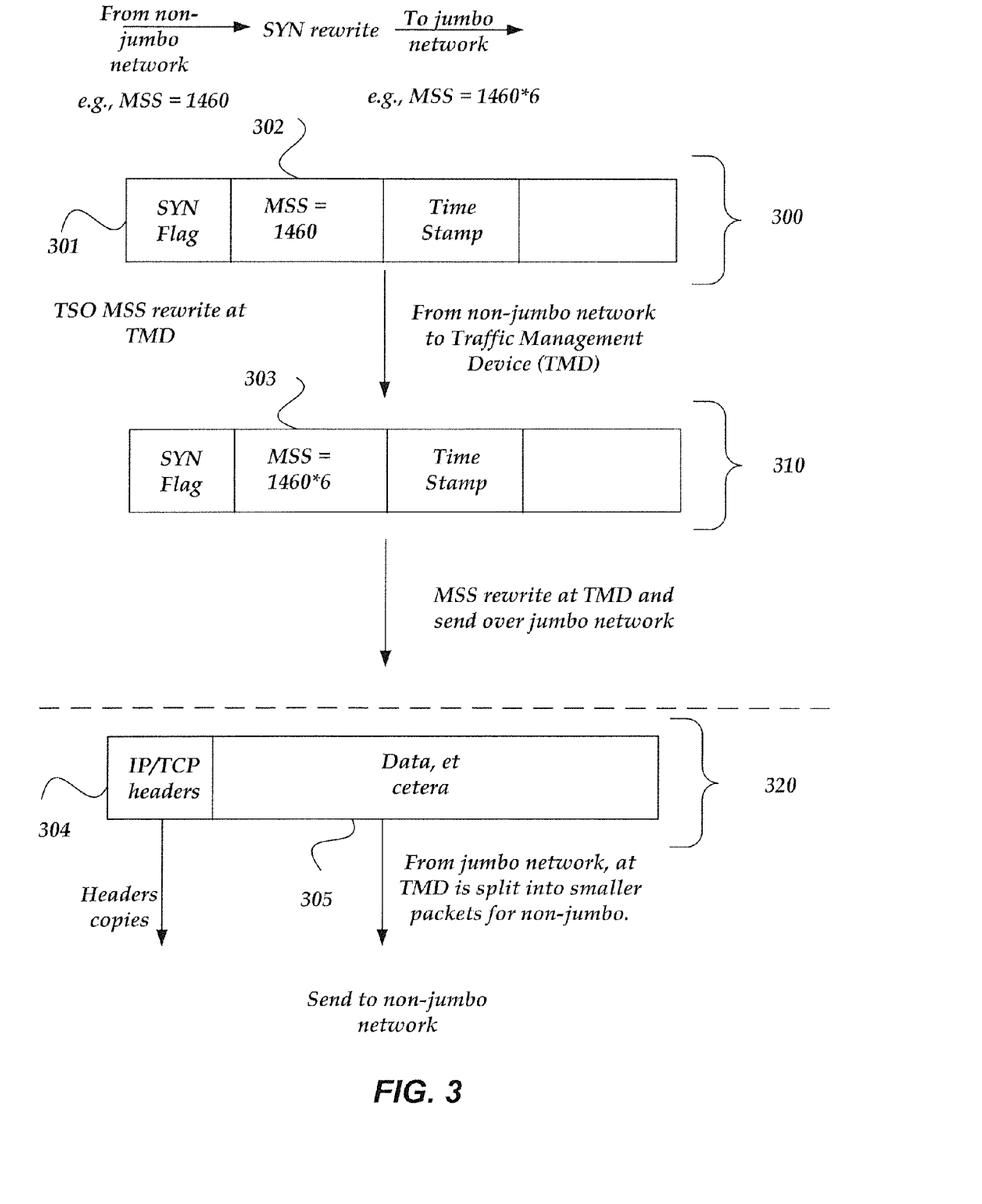
FIG. 3 illustrates a non-exhaustive, non-limiting packet flow with SYN message rewrites corresponding to the logical flow of FIG. 4.

The operation of certain aspects will now be described with respect to FIGS. 3-4. FIG. 3 illustrates a non-exhaustive, non-limiting packet flow with SYN message rewrites corresponding to the logical flow of FIG. 4 discussed further below. Not all the components may be required to practice the described embodiments, and variations in the arrangement and type of the components may be made without departing from the spirit or scope of the described embodiments. Thus, that shown in FIG. 3 should not be construed as limiting the subject innovations disclosed herein. In any event, as shown, packets such as packet 300 may be received at TMD 110 of FIG. 1 and managed, at least using TCP offload processing within a NIC card as discussed above.

In one embodiment, packet 300 may represent a message received from a non-jumbo device during an initial TCP handshake protocol to establish a connection with a jumbo device. As such, in one embodiment, packet 300 may be sent as a SYN message, indicated by SYN flag 301 within packet 300 being set. In one embodiment, packet 300 might be received at TMD 110 from one of client devices 102-104 of FIG. 1 to establish a connection with one of server devices 112-115.

As shown, packet 300 includes a MSS value 302 indicating use of non-jumbo frames. When received at TMD 110, the MSS information may be rewritten to indicate that the sending device of packet 300 allows sending by one of the server devices of jumbo frames. In one embodiment, the MSS is rewritten as a multiple of the received MSS 302 value. However, other values may also be used. Thus, the values shown in FIG. 3 are examples, and not to be construed as limiting. As shown, TMD 110 may rewrite MSS 302 into the packet and send the modified packet 310 towards a selected server device. In one embodiment, MSS values from the server device need not be rewritten. In any event, now data from the server may employ jumbo frames.

At TMD 110 jumbo packets such as packet 320 may then be fragmented or split into smaller, non-jumbo packets, with the headers of the packet substantially copied into the fragments. The segmented packets may, however, be modified to include segment value, sequence values, or the like. Moreover, in at least one embodiment, non-jumbo packets received by TMD 110 from client devices 102-104 may be allowed to be sent to the jumbo server, as non-jumbo sized packets. However, in another embodiment, TMD 110 may select to aggregate or combine smaller, non-jumbo frame packets, and provide the aggregated packets to the server as jumbo frame packets.

In one embodiment, such actions may be performed by TMD 110 using TSO and/or LRO operations within an off-load engine.

Figure 4:
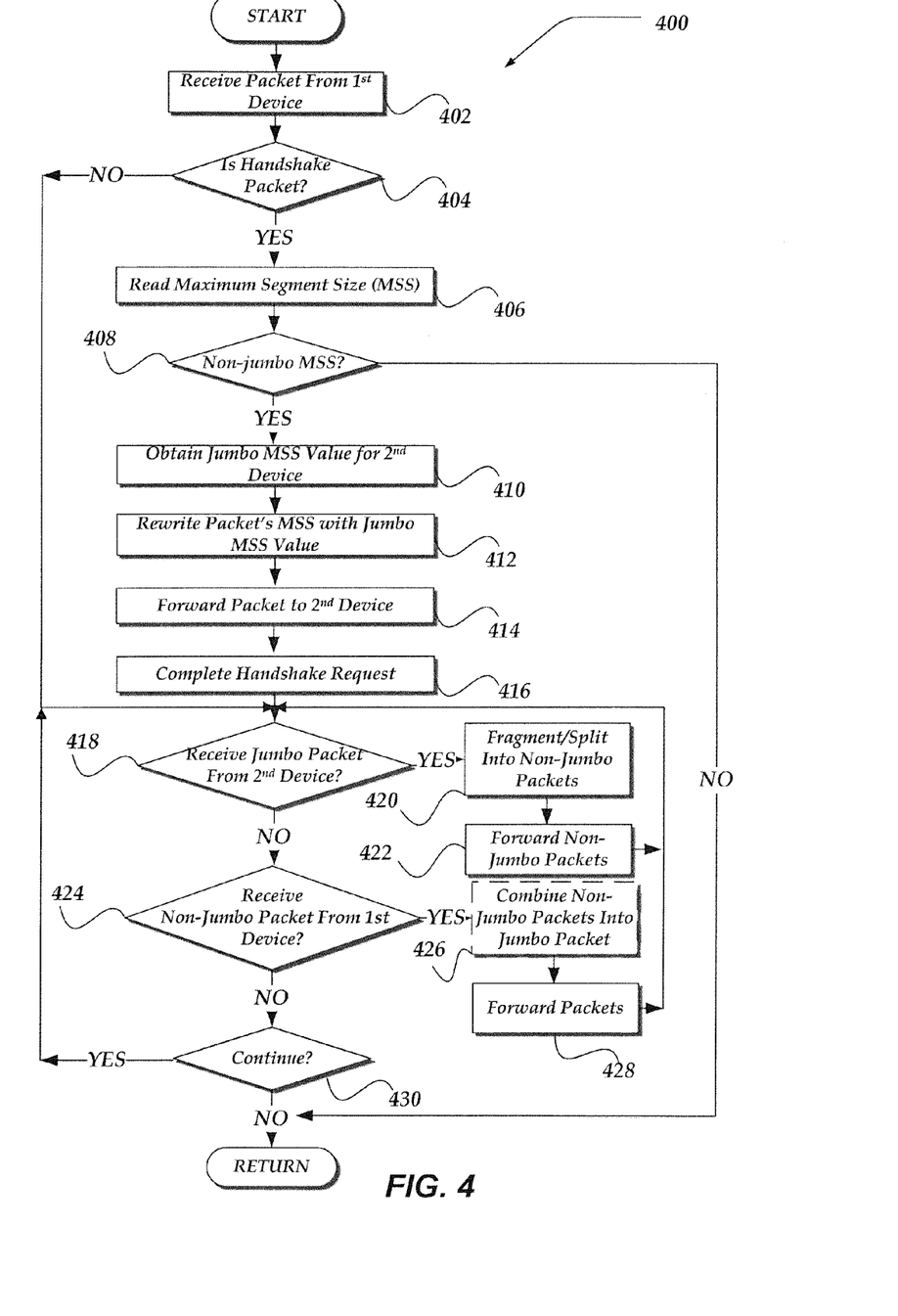
FIG. 4 illustrates a logical flow of SYN message rewrites to manage communications between jumbo and non-jumbo networks.

FIG. 4 illustrates a logical flow of SYN message rewrites to manage communications between jumbo and non-jumbo networks. Process 400 of FIG. 4 may be performed within, network 200 of FIG. 2, or otherwise within TMD 110 of FIG. 1.

Process 400 begins, after a start block, at block 402, where a packet is received from a first computing device. As noted above, the packet is received or otherwise intercepted by TMD 110 of FIG. 1. Flowing next to decision block 404, a determination is made whether the packet is part of a communications handshake protocol, such as a TCP handshake protocol to establish a connection with a second computing device. If the packet is not part of a handshake protocol, processing branches to decision block 418; otherwise, processing continues to block 406.

At block 406, the MSS value within the packet is read to determine, at decision block 408, if the packet is requesting a non-jumbo type of communications. If it is determined that the communications between the first and second computing devices are likely to be between jumbo and non-jumbo devices then processing flows to block 410; otherwise it is determined that both first and second computing devices employ jumbo type of communications, and processing returns.

At block 410, an MSS value useable for communications with the second computing device using jumbo communications is determined. The MSS value for jumbo communications with the second computing device may be obtained using any of a variety of mechanisms. For example, in one embodiment, the value might be determined based on a previous communications with the second computing device. In another embodiment, an assumed large MSS value might be used. By using an assumed large MSS value, such as might be considered a maximum MSS value for jumbo communications, then should the second computing device be unable to communicate at that value, the second computing device may respond with a lower MSS value. This lower MSS value from the second computing device is expected to still be within jumbo frame MSS values. This lower MSS value may also be stored for subsequent communications with the second computing device.

In some embodiments, an integer multiple of the non-jumbo MSS value may be used to increase the MSS value to be within a jumbo frame MSS value range. In any event, processing then flows to block 412, where this determined jumbo MSS value is then used to rewrite the packet's MSS value. Processing continues next to block 414, where the rewritten packet is then forwarded to the second computing device. Continuing to block 416, the handshake communications may continue with a response from the second computing device, which in turn is rewritten, to further indicate, as appropriate, so that the first computing device may send packets using the non-jumbo frame sizes, and the second computing device may use jumbo frame sizes.

Process 400 flows next to decision block 418, where a determination is made whether a non-handshake packet is received from the second computing device. Such packets are received using the jumbo frame size. If such packets are received, processing flows to block 420; otherwise, processing flows to decision block 424.

At block 420, the jumbo packets may be split or otherwise fragmented into smaller, non-jumbo packets, as discussed above in conjunction with FIG. 3. Then flowing to block 422, these non-jumbo packets are sent to the first computing device. Processing then branches back to decision block 418.

At decision block 424, a determination is made whether a non jumbo packet is received from the first computing device, outside of a handshake communication. If so, processing flows to block 426; otherwise, processing flows to decision block 430.

At block 426, in some embodiments, the non-jumbo packets may be sent (at block 428) without modifications to the seconding computing device. However, in other embodiments, the non-jumbo packets may be buffered until a sufficient number of them are received. In some embodiments, the interposed network device may provide Acknowledgement and/or other messages to the first computing device to acknowledge receipt of the non-jumbo packets. The buffered packets may then be combined into a jumbo packet, where at block 428, the jumbo packet is forwarded to the second computing device. Processing then branches to decision block 418.

At decision block 430, a determination is made whether to continue communications of packets between the jumbo and the non-jumbo device. If so, then processing branches back to decision block 418; otherwise, processing returns.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A traffic management device (TMD) interposed between a first computing device and a second computing device, comprising:

a transceiver to send and receive data over a network; and one or more physical devices operative to perform actions comprising:

receiving within a synchronization (SYN) handshake message from the first computing device a packet at layer 3 of the Open Systems Interconnection (OSI) model indicating that a communication from the first computing device is using non jumbo frames at layer 2 of the OSI model, based on a maximum segment size (MSS) value;

rewriting the MSS value within the SYN handshake message to increase the MSS value to indicate communications are to use jumbo frames at layer 2 of the OSI model; and forwarding the rewritten SYN handshake message to the second computing device, such that communications with the second computing device uses jumbo frames at layer 2 of the OSI model and wherein the jumbo frames are split into smaller frames and resent to the first computing device as non jumbo frames at layer 2 of the OSI model.

2. The TMD of claim 1, wherein at least some non jumbo frames received by the TMD are forwarded to the second computing device as non jumbo frames.

3. The TMD of claim 1, wherein at least some non jumbo frames received by the TMD are combined to create a jumbo frame, the created jumbo frame being forwarded to the second computing device.

4. The TMD of claim 1, wherein increasing the MSS value to indicate communications are to use jumbo frames comprises increasing the MSS value to a maximum value for jumbo frames and using a MSS value received from the second computing device in response, for subsequent communications with the second computing device.

5. The TMD of claim 1, wherein at least some processing is performed within an offload engine within the TMD including at least one of performing packet segmentation or packet combining.

6. The TMD of claim 1, wherein rewriting the MSS value comprises rewriting the MSS value as an integer multiple of the received MSS value such that the resulting MSS value indicates a jumbo frame MSS value.

7. The TMD of claim 1, wherein the one or more physical devices comprise at least one of a general purpose processor or a network interface card.

8. A computer-based method operating on a network device, comprising:

performing actions on the network device that is interposed between a first computing device and a second computing device, the actions including:

receiving within a synchronization (SYN) handshake message from the first computing device a packet at layer 3 of the Open Systems Interconnection (OSI) model indicating that a communication from the first computing device is using non jumbo frames at layer 2 of the OSI model, based on a maximum segment size (MSS) value;

rewriting the MSS value within the SYN handshake message to increase the MSS value to indicate communications are to use jumbo frames at layer 2 of the OSI model; and forwarding the rewritten SYN handshake message to the second computing device, such that communications with the second computing device uses jumbo frames at layer 2 of the OSI model and wherein the jumbo frames are split into smaller frames and resent to the first computing device as non jumbo frames at layer 2 of the OSI model.

9. The computer-based method of claim 8, wherein at least some non jumbo frames received by the network device are forwarded to the second computing device as non jumbo frames.

10. The computer-based method of claim 8, wherein at least some non jumbo frames received by the network device are combined to create a jumbo frame, the created jumbo frame being forwarded to the second computing device.

11. The computer-based method of claim 8, wherein increasing the MSS value to indicate communications are to use jumbo frames comprises increasing the MSS value to a maximum value for jumbo frames and using a MSS value received from the second computing device in response, for subsequent communications with the second computing device.

12. The computer-based method of claim 8, wherein at least some processing is performed within an offload engine within the network device including at least one of performing packet segmentation or packet combining.

13. The computer-based method of claim 8, wherein rewriting the MSS value comprises rewriting the MSS value as an integer multiple of the received MSS value such that the resulting MSS value indicates a jumbo frame MSS value.

14. The computer-based method of claim 8, wherein splitting the jumbo frames further comprises modifying at least one of a segment value or sequence value for at least one of the smaller frames.

15. An apparatus comprising a non-transitory computer readable medium, having computer-executable instructions stored thereon, that in response to execution by a network device that is interposed between a first and a second computing device, cause the network device to perform operations, comprising:

receiving within a synchronization (SYN) handshake message from the first computing device a packet at layer 3 of the Open Systems Interconnection (OSI) model indicating that a communication from the first computing device is using non jumbo frames at layer 2 of the OSI model, based on a maximum segment size (MSS) value;

rewriting the MSS value within the SYN handshake message to increase the MSS value to indicate communications are to use jumbo frames at layer 2 of the OSI model; and forwarding the rewritten SYN handshake message to the second computing device, such that communications with the second computing device uses jumbo frames at layer 2 of the OSI model and wherein the jumbo frames are split into smaller frames and resent to the first computing device as non jumbo frames at layer 2 of the OSI model.

16. The apparatus of claim 15, wherein at least some non jumbo frames received by the network device are forwarded to the second computing device as non jumbo frames.

17. The apparatus of claim 15, wherein at least some non jumbo frames received by the network device are combined to create a jumbo frame, the created jumbo frame being forwarded to the second computing device.

18. The apparatus of claim 15, wherein increasing the MSS value to indicate communications are to use jumbo frames comprises increasing the MSS value to a maximum value for jumbo frames and using a MSS value received from the second computing device in response, for subsequent communications with the second computing device.

19. The apparatus of claim 15, wherein at least some processing is performed within an offload engine within the network device including at least one of performing packet segmentation or packet combining.

20. The apparatus of claim 15, wherein rewriting the MSS value comprises rewriting the MSS value as an integer multiple of the received MSS value such that the resulting MSS value indicates a jumbo frame MSS value.

21. The apparatus of claim 15, wherein the apparatus is configured to further perform at least one of a Transmission Control Protocol (TCP) segmentation offload, or a TCP Large Receive Offload operation.

22. The apparatus of claim 15, further comprising at least one of a general purpose processor or a network interface card.

* * * * *